2,869,226

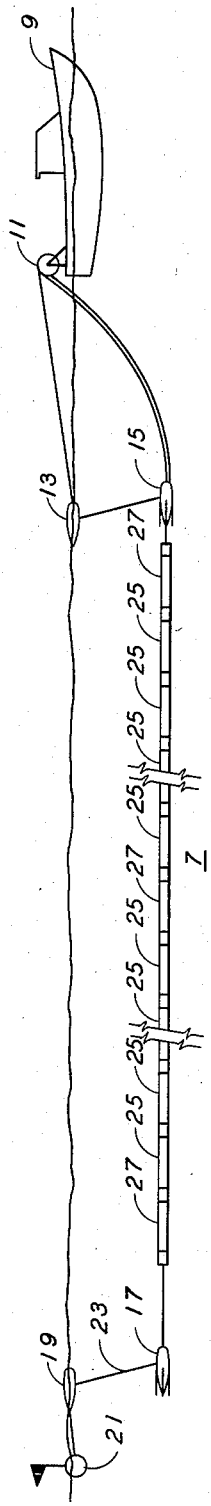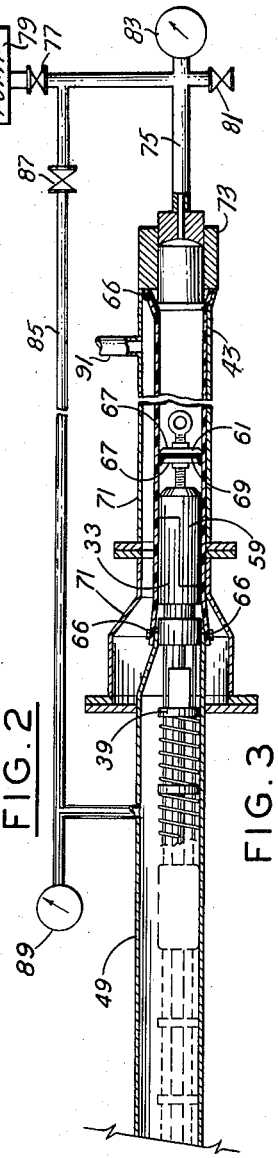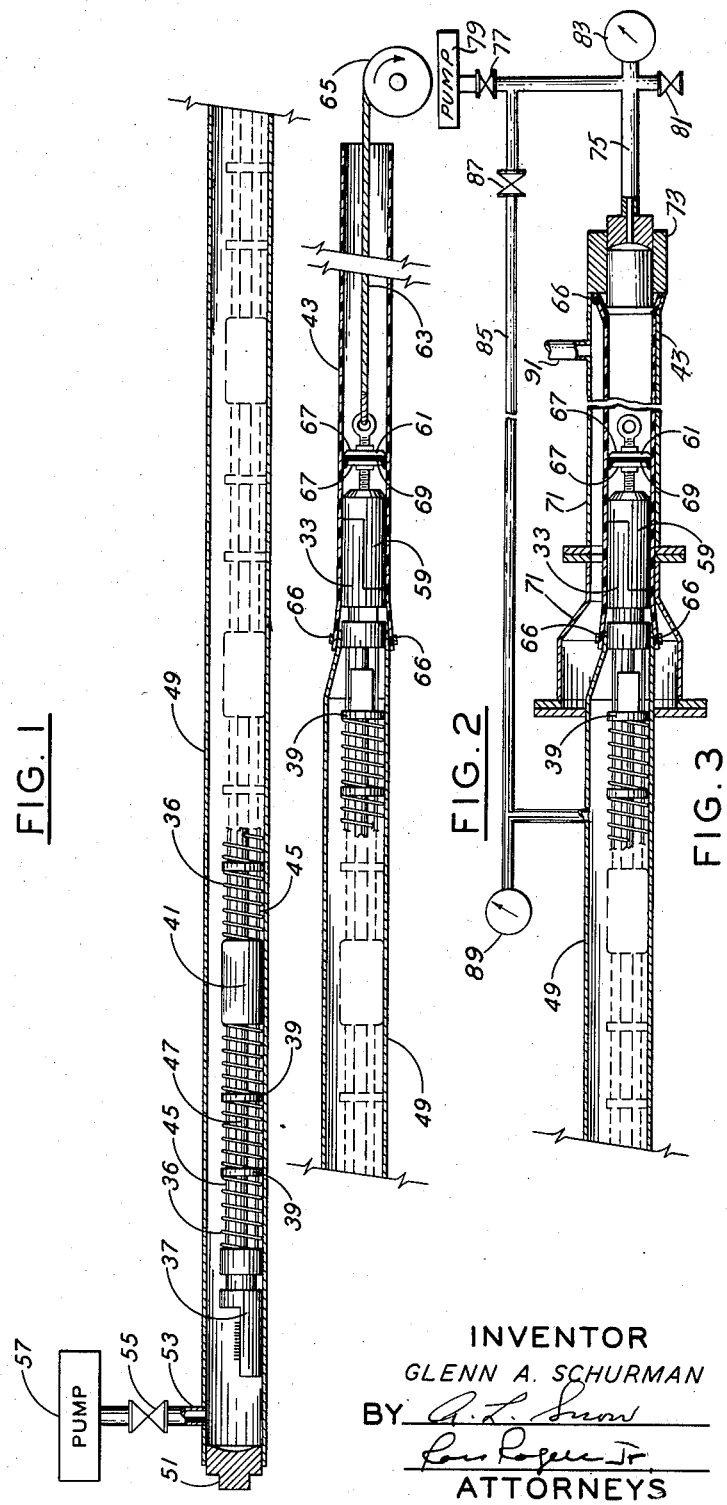
Jan. 20, 1959 G. A. SCHURMAN 2,869,226
CABLE ASSEMBLY METHOD AND APPARATUS
Filed March 24, 1954
INVENTOR
GLENN A. SCHURMAN
ATTORNEYS United States Patent Office 2,869,226
Patented Jan. 20, 1959

CABLE ASSEMBLY METHOD AND APPARATUS

Glenn A. Schurman, Whittier, Calif., assignor to California Research Corporation, San Francisco, Calif., a corporation of Delaware Application March 24, 1954, Serial No. 418,401

1 Claim. (Cl. 29—421)

My invention relates to a method of introducing equipment into a tube and particularly to the insertion of the equipment into a tightly fitting sleeve.

Briefly stated, my method involves affixing a piston to the end of the equipment and subjecting the piston to air pressure which forces the piston and the equipment into a sleeve and also tends to expand the sleeve by pressure. My invention will be discussed in connection with a marine seismic cable to which the method is particularly applicable.

The novel features of my invention are set forth with more particularity in the appended claim. The invention, itself, with respect to the details thereof, may be better understood from the following description of specific embodiments with reference to the accompanying drawings in which:

Fig. 1 shows schematically a seismic cable in use.

Fig. 2 shows a partial cross-section of equipment for assembling a seismic cable.

Fig. 3 shows an alternative embodiment of my invention.

As shown in Fig. 1, a seismic cable 7 is towed behind a boat 9. A reel 11 on the boat 9 is attached to a buoy 13 and a paravane 15. The paravane is attached to the cable 7 and arranged to maintain a constant depth below the surface of the water. A second paravane 17 at the other end of the cable 7 maintains the rear end of the cable at a constant level below the surface. Rear buoy 19 and marker buoy 21 are attached to the rear paravane 17 by a cable 23 which has a length determined by the depth at which the cable 7 is to be towed. The cable, itself, consists of a number of active detector sections 25 and a number of inactive sections 27. The sections 25 contain pressure detectors which are adapted to detect pressure variations in the water. The inactive sections 27 contain conductors which transmit signals from the detectors.

In operation, the cable is reeled out on the reel 11 when the boat 9 is in the vicinity which is to be explored. The paravanes 15 and 17 are located at the desired depth below the surface of the water. The boat 9 moves over the prospect at a slow rate of speed and a charge of explosive is detonated near the center of the cable 7. The inactive section 27 at the center of the cable serves to separate active sections 25 from the immediate vicinity of the shot in order to avoid having the explosive damage the pressure detectors. The inactive sections 27 at the ends of the cable serve as terminations for the cable. Signals from the pressure detector are transmitted through a cable to the boat 9, where they are recorded. The pressure signals from each active section 25 of the cable 7 may be recorded separately, or signals from the various sections 25 may be mixed and recorded.

Referring to Fig. 2, the mechanism which is to be fitted into a cable sleeve consists of a spring member 36, spacer members 39, and detector crystal assembly 41. It is essential to the proper operation of the detector cable that the internal elements of the cable fit snugly against the protective Neoprene sleeve. The spring members 37 and the spacer members 39 support the sleeve and prevent its collapsing under hydrostatic pressure. The crystal assembly 41 fits snugly against the protective sleeve 43 in order to provide a maximum of acoustic coupling between the ambient sea water and the crystal detector. Four strength members 45 provide longitudinal strength for the cable. A central core 47 contains conductors which receive signals from crystals in the section and conduct signals from sections further from the recording boat 9 than the present section. Male and female couplers 37 and 33 are connected at either end of the cable section for use in coupling together sections of the cable. The couplings 33 and 37 in this example are approximately two inches in outer diameter. The other portions of the cable also have a two-inch outer diameter. The sleeve 43, which is to cover the cable section, has an inner diameter of slightly less than two inches and an outer diameter of two and three-eighths inches. The assembly of such a cable section presents a severe problem. The couplings 33 and 37 and the other elements to be fitted within the cable section have an outer diameter slightly larger than the inner diameter of the Neoprene sleeve 43. The crystals 41 and the other elements to be fitted within the cable section are delicate and must be handled carefully and be accurately spaced if the cable section is to operate properly. Therefore, it has not been found to be feasible to assemble the cable by placing the elements within the sleeve 43 one at a time. If the sleeve 43 were merely supported and an effort were made to pull the completed internal assembly into the sleeve 43, the sleeve 43 would extend in length and contract in diameter, thus greatly increasing the difficulty of assembling the cable section. It remains then to devise a method whereby the diameter of the sleeve 43 is enlarged while the active members are introduced into it.

For this purpose, I employ the apparatus shown in Fig. 2. A pressure resistant vessel 49 has a removable end plug 51, and is adapted at the other end to be secured to the sleeve 43. A pipe 53 leads through a valve 55 to a pressure pump 57. An adapter 59 may be affixed to the female connector 33. A piston 61 is connected to the adapter and a cable 63 leads from the piston 61 to a winch 65. The pressure vessel 49 is necked down at a point where it is connected to the sleeve 43. A clamping member 66 tightly secures the tube 43 to the pressure vessel 49. The piston 61 comprises two face plates 67 and a rubber gasket 69. The rubber gasket 69 is supported by the face plate 67 and fits tightly against the sleeve 43. Before beginning assembly I prefer to lubricate the interior of the sleeve with castor oil. The oil also serves to exclude air between the crystal assembly 41 and the sleeve 49 and thereby provides acoustic coupling between the water and the crystal assembly 41.

In operation, the active elements of the pressure cable are placed within the pressure vessel 49. The adapter 59 is affixed to the connector 33 and the piston 61 is introduced into the sleeve 43. The sleeve 43 is affixed to the pressure vessel 49 by the clamp 66. The cable 63 is affixed to the piston 61. The plug 51 is placed in the end of the pressure vessel 49. The valve 55 is opened and the pump 57 is placed in operation to increase the pressure within the pressure vessel 49. The winch 65 operates to pull on the piston 61. The pressure on one face of the piston 61 is of a high value caused by the action on pump 57. Pressure on the other face of the piston 61 is atmospheric. Thus, the piston 61 moves into the sleeve 43 under combined action of air pressure from the pump 57 and the pull on the cable 63. As the active elements of the cable move farther into the sleeve 43, the air pressure operates to expand the tube 43 to decrease the snugness of the fit. Since force is exerted at several points on the active section, there is less of a tendency for the tube 43 to decrease in diameter and further constrict movement of active members into the tube. When the active members are introduced sufficiently into the tube 43, the clamps 66 are released. The tube 43 is trimmed and affixed to the connectors 33 and 37.

Fig. 3 shows an alternative arrangement for assembling the cable. Affixed to the pressure vessel 49 is a second pressure vessel 71 having an end plug 73, pipe connection 75, a valve 77, and a pump 79. A bleeder valve 81 is also provided, together with a gauge 83 to measure the pressure inside the tube 43. A pipe connection 85 connects between the inside of the tube 43 and the pressure vessel 49. A valve 87 controls flow in this pipe. A gauge 89 measures the pressure in the pressure vessel 49. An exhaust vent 91 provides a communication between atmosphere and the volume between the pressure vessel 71 and the tube 43.

In operation, the tube 43 is placed in pressure vessel 71 and clamped at both ends forming a chamber between pressure vessel 71 and tube 43. The active elements of the cable are enclosed in the pressure vessel 49 and the piston 69 is placed in the entrance of the tube 43. Plug 51 is placed in pressure vessel 49 and plug 73 is placed in pressure vessel 71. The valves 55 and 81 are closed and valves 77 and 87 are opened. The pump 79 is operated to increase the pressure within the hose 43 and within the pressure vessel 49. This pressure forces the tube 43 against the sides of the pressure vessel 71. The air in the annular space between the tube 43 and the pressure vessel 71 escapes through the exhaust vent 91. Valves 77 and 87 are then closed. Pump 57 is placed in operation and valve 55 is opened. As the pressure in pressure vessel 49 begins to exceed the pressure indicated on the gauge 83, the piston 69 moves into the tube 43. As the piston 69 moves further into the tube 43, the air pressure indicated on the gauge 83 tends to increase. The valve 81 is opened sufficiently to maintain a constant pressure indication on the gauge 83. The pressure indicated on the gauge 89 is therefore sufficiently greater than the pressure indicated on the gauge 83 to provide a pressure differential across the piston 69 and thereby force the active elements of the pressure cable further into the tube 43. This process is continued until the active elements are in proper position within the tube 43.

Under some circumstances, this arrangement may be superior to that described with reference to Figure 2, in that the tube 43 is expanded before the piston 69 begins to move through it, rather than being expanded as the piston 69 begins to move. Further, the tube 43 is in intimate contact with the sides of the pressure vessel 71 and the friction between the pressure vessel 71 and the tube 43 prevents the hose 43 from moving with the piston 69. This prevents the necking down effect which results from stretching portions of the tube 43 in a direction along its axis, and prevents any wrinkling of the tube 43 ahead of the piston 69 which might hinder movement of the piston 69.

While I have described specific embodiments of my invention, I am aware that modifications may be made in it without departure from the scope of my invention. I do not, therefore, intend that my invention be limited, except as set forth in the appended claim.

I claim:

The method for encasing a series of flexibly interconnected seismic detector units within a flexible water-impervious covering comprising placing said interconnected units within a first pressure vessel having a closed end and an open end, placing said flexible covering within a second pressure vessel having an interior diameter greater than the relaxed exterior diameter of said flexible covering, securing one end of said flexible covering to the open end of said first pressure vessel in a fluid-tight connection and in communication with the interior thereof, securing the other end of said flexible covering to the inner walls of said second pressure vessel with a fluid-tight connection, providing a vent from the interior of said second pressure vessel to the atmosphere, attaching a piston element to an end of said interconnected units and placing said interconnected units within said first pressure vessel with said piston element adjacent the open end thereof, slidably engaging said piston element within the said one end of said flexible covering, placing the interior of said first pressure vessel and the interior of the said flexible covering within said second pressure vessel under superatmospheric pressure to expand said flexible covering, creating a pressure differential between said first pressure vessel and the interior of said flexible covering to force said piston element into said flexible covering, maintaining the pressure differential between said first pressure vessel and the interior of said flexible covering to cause said piston element together with said interconnected units to be forced through substantially the entire length of the interior of said flexible covering, releasing the pressure from said first pressure vessel and from the interior of said flexible covering to retract said flexible covering around the circumference of said interconnected units, detaching the said one end of said flexible covering from the said first pressure vessel, removing said flexible covering with the interconnected units enclosed therein from the said second pressure vessel, detaching the said piston element from the end of said interconnected units, securing the ends of said flexible covering to the corresponding ends of said interconnected units.

References Cited in the file of this patent

UNITED STATES PATENTS

| | | |
|---|---|---|
| 942,184 | Persons | Dec. 7, 1909 |
| 1,461,130 | Loughead | July 10, 1923 |
| 2,101,996 | Gerstenberg | Dec. 14, 1937 |
| 2,359,532 | Searle | Oct. 3, 1944 |
| 2,515,953 | Dufresne | July 18, 1950 |

OTHER REFERENCES

Electrical World, June 23, 1928, vol. 91, p. 1334.